March 18, 1947.  T. M. JOHNSTON  2,417,501
AUTOMOBILE HEADLIGHT SIGNAL INDICATOR
Filed March 29, 1946
Fig. 1.
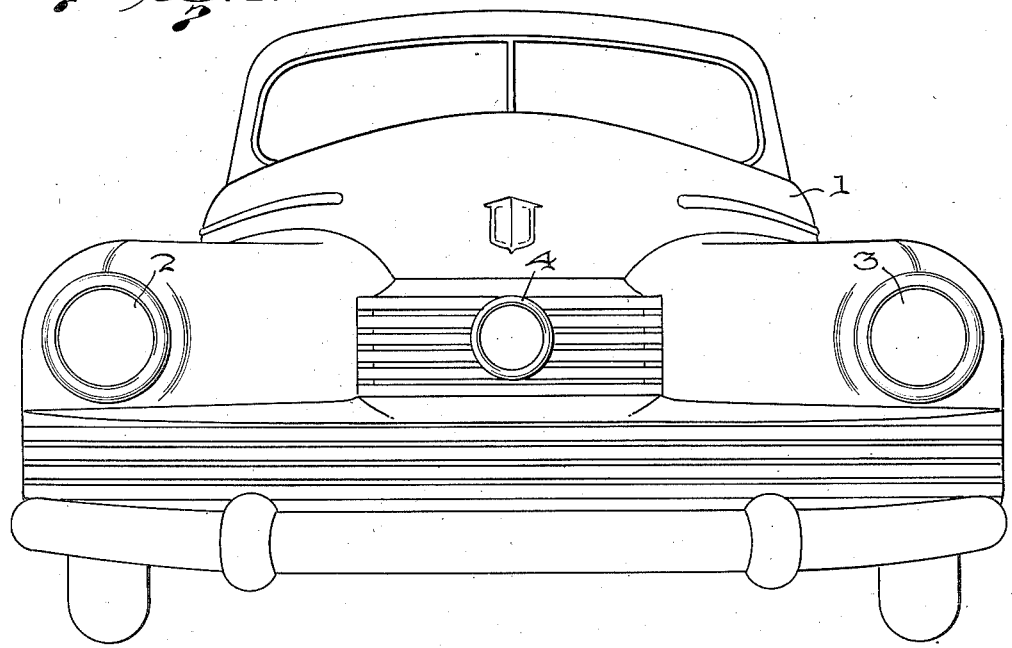
Fig. 3.
Fig. 2.
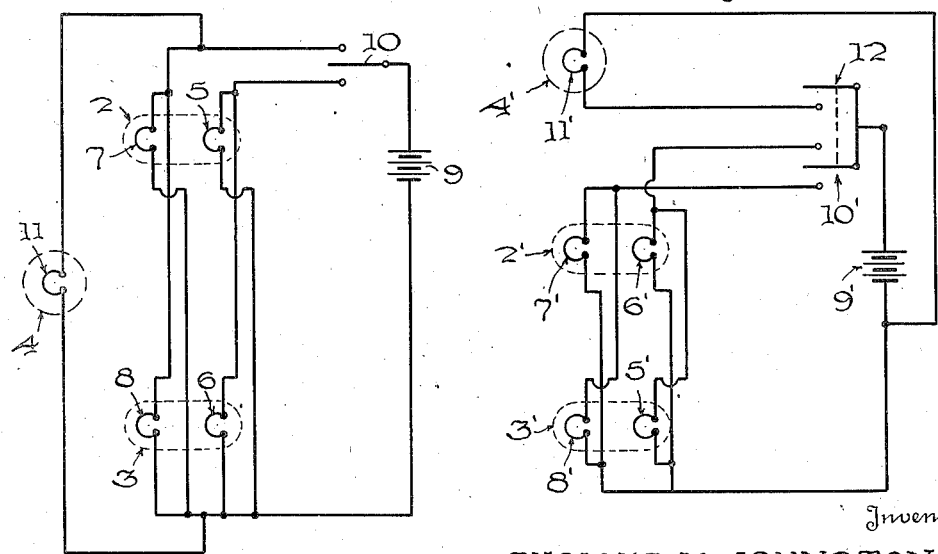
Inventor
THOMAS M. JOHNSTON
Attorneys Patented Mar. 18, 1947

2,417,501

UNITED STATES PATENT OFFICE 2,417,501

AUTOMOBILE HEADLIGHT SIGNAL INDICATOR

Thomas M. Johnston, Washington, D. C.

Application March 29, 1946, Serial No. 657,986

3 Claims. (Cl. 315—82)

The present invention relates to means for indicating to the driver of an approaching vehicle the condition of the headlights of an automobile or similar vehicle, and particularly to indicate, immediately and positively, to the driver of such an approaching vehicle whether one's bright, or driving lights, or dim, or city lights, are illuminated.

Modern automobiles and similar vehicles are equipped with a set of main headlamps, each of which is so constructed that, through suitable electrical connections, the driver of the vehicle has at his command two lights of different intensities. Ordinarily, the headlamps consist of parabolic reflectors and a plurality of filaments, either one of which may be connected in an electrical circuit to be illuminated. One filament frequently is positioned approximately in the focal point of the parabolic reflector while the second filament is positioned off the focal point. When the filament in the focal point of the parabolic reflector is illuminated, a bright light is projected substantially horizontally from the headlamp. On the other hand, when the filament which is located off the focal point of the parabolic reflector is illuminated, the light from the headlamp is directed downwardly at an angle from the horizontal.

In some types of headlamps, particularly those of the so-called "sealed beam" type, two filaments are used in each headlamp which are practically integral but are so electrically connected that one may be energized without energizing the other. However, regardless of the particular type of headlamps which is used, it is common practice to so arrange the filaments that one is positioned approximately at the focal point of the reflector while the other is positioned off of the focal point so that the rays of light emanating from the headlamp may be reflected forwardly along the principle axis of the parabolic reflector or directed downwardly so that they strike the road at a position not far in front of the automobile so that better illumination of the road or street immediately ahead of the automobile is obtained.

It is common practice to use the bright driving lights when driving in the country or on unilluminated streets so that illumination of the road well in advance of the automobile will be obtained, and to use the dim, or city lights, when driving in a city where the streets are illuminated and visibility is not entirely cut off.

The intensity of the bright or driving lights of an automobile varies with the choice of the manufacturer. Where the driving lights are of relatively high intensity, or are not properly adjusted so that the rays of lights emanating therefrom extend upwardly to a slight extent, or where the automobile or vehicle is heavily loaded in the rear so that the body tilts upwardly slightly in the front, which also may cause the rays of light to be directed slightly upwardly, the lights frequently are a source of annoyance to the drivers of approaching vehicles as they tend to "blind" such drivers so that they cannot clearly see the road on which they are driving. Such blinding of the drivers of approaching vehicles creates a hazardous condition and has resulted in many wrecks and deaths.

It is more or less common practice for the driver of an approaching vehicle who is annoyed or who tends to be blinded by the brightness of one's headlamps to "flicker" his headlamps, that is, switch them back and forth from the bright to the city lights to indicate to the driver of the vehicle with the "blinding" lights that it is desired he switch his headlamps to illuminate the filament of less intensity until the vehicles have passed. Such signals ordinarily are recognized and the driver of the vehicle with the "blinding" lights customarily dims them. However, it sometimes happens that even the dim or city lights of an automobile are of such intensity that they tend to "blind" some drivers whose eyes are more sensitive to bright lights than others. Even though the driver of such a vehicle may be driving with his dim lights illuminated, the driver of an approaching vehicle may think that the bright lights are burning and flicker his lights to signal the driver that a dimming of the lights is desired. In such cases, the driver of the vehicle ordinarily will "flick" his lights, that is switch to the lights of greater intensity and then quickly back to the lights of less intensity, to show that the lights of less intensity were burning initially. In other words, the present system requires considerable judgment on the part of the motorist in determining the condition of the lights of an approaching car.

The purpose of the present invention is to overcome the above disadvantages in an effective and novel manner so that a signal or indication as to which of the lights of the automobile, that is, the bright or dim lights, are burning. To that end a signal light, preferably of a distinctive color, is mounted on the front of the automobile between the two main headlamps or some other place where it readily may be seen by the drivers of approaching vehicles, or others desirous of knowing whether one's bright or dim lights are burning. Such a signal light is of sufficient intensity to be seen at a reasonable distance and is so connected electrically with the filaments of the two main headlamps that it is energized whenever one of the filaments of the headlamps, preferably the filament of lesser intensity, is energized. The signal indicator being mounted on the front of the automobile and positioned to direct the light therefrom in a forward direction readily indicates to the driver of an approaching vehicle whether or not the bright or dim lights are illuminated. If the dim lights are illuminated, it saves the driver of an approaching vehicle the distraction of flickering his headlights as referred to above, if the dim lights actually are of such intensity that the driver of an approaching vehicle otherwise might mistake them for the bright or driving lights.

The invention will be further described in connection with the accompanying drawings but it is understood that such further disclosure and description is by way of exemplification and the invention is not limited thereto except to the extent set forth in the appended claims.

In the drawings:

Fig. 1 is the front view of an automobile showing the main headlights and the signal indicator light of the present invention positioned between them.

Fig. 2 is a circuit diagram showing the various elements of my invention in their electrical relation to one another, and Fig. 3 is a circuit diagram similar to Fig. 2 showing the various elements of a modified form of my invention in their electrical relation to one another.

Referring to the drawings and first to Fig. 1, I represents an automobile having the usual headlamps 2 and 3 at the front thereof. The headlamps 2 and 3 may be positioned in the front of the fenders or at any other place on the front of the automobile. The headlamps 2 and 3 are of the usual type such as are referred to above and contain two filaments for alternate energization, depending upon whether a bright driving light or light of lesser intensity is desired. A signal light 4 which is connected in circuit with one set of the filaments of the headlamps 2 and 3, preferably the filaments of less intensity, is located on the front of the automobile, preferably between the headlamps 2 and 3, and in a horizontal plane extending between them. The signal light 4 is positioned to direct the rays of light therefrom forwardly so that they will be readily visible by the driver of an approaching vehicle, or any person desirous of knowing whether or not the bright or dim lights are illuminated.

The size of the signal light 4 is not of particular importance, but, preferably, is somewhat smaller than the main headlamps. It may take different shapes, and, if desired, may be positioned at some place on the automobile, other than between the main headlamps 2 and 3. If the signal light 4 is placed midway between the main headlamps, it would, in case one of the headlamps were not illuminated, instantly indicate to the approaching car which headlamp was not operating. However, regardless of the position on the automobile where it is placed, it should be so positioned that the light rays emanating therefrom are directed forwardly so that they will be visible by the drivers of approaching vehicles. The color of the rays emanating from the signal lamp should be of some distinctive color, preferably amber, so that they readily can be distinguished from the headlamps which provide the main illumination. While amber is a very desirable color for such a signal light, other distinctive colors such as blue, green, etc., or combinations of colors may be used. The manner in which the color is imparted to the light rays forms no part of the present invention. The use of a suitable filter is a convenient way of imparting the desired color to the signal lamp, but any other method of imparting the desired color to the rays emanating from the signal lamp may be employed.

The manner in which the signal lamp 4 is electrically connected in the circuit of the headlamps 2 and 3 is shown in the circuit diagram of Fig. 2, which discloses only that part of the electrical system of the automobile which is necessary for a clear understanding of the invention. Referring to that figure, the headlamps 2 and 3 of the automobile have filaments 5 and 6 of greater intensity and filaments 7 and 8 of lesser intensity. The filaments are connected in parallel to a battery 9, or other source of electrical current. The usual switch 10 is provided for completely disconnecting the filaments of the headlamps from the electrical circuit or for connecting the filaments 5 and 6 to give a light of bright intensity or to connect the filaments 7 and 8 to give a light of less intensity. The signal indicating lamp 4 has the filament 11 thereof connected in the circuit with the filaments 7 and 8 of less intensity of the headlamps 2 and 3 so that the signal lamp is energized whenever those filaments of the headlamps are energized by the shifting of the switch 10 to the proper position.

From the above, it will be seen that whenever the switch 10 is shifted to a position to illuminate the filaments 7 and 8 of the headlamps to cause a light of lesser intensity to be projected from the headlamps, the filament 11 of the signal lamp 4 also will be energized so that a signal light will be projected forwardly from the automobile and indicate that the dim, or city, lights thereof are the ones which are energized.

The present invention, of course, presupposes that the public generally will be educated to the fact that the signal lamps are connected in circuit with the dim or city lights so that when anyone sees the signal lamp 4 illuminated he will know that it is the dim and not the bright lights of the automobile which are energized.

The present invention not only is effective to indicate to drivers of approaching vehicles on the road whether or not the bright or dim lights of an automobile are burning but also will give such an indication to law enforcement officers in a city, because if a law enforcement officer sees the signal light burning he will immediately know that the driver of the vehicle has his dim or city lamps illuminated, and consequently is not violating the city ordnances.

The diagram of Fig. 3 illustrates a modification of the invention in which the signal lamp is not connected directly in the current with the filaments of less intensity but is actuated through a separate switch, but energized simultaneously with the filaments of lesser intensity of the headlamps being energized. In that figure, the headlamps 2' and 3' have filaments 5' and 6' of greater intensity and filaments 7' and 8' of lesser intensity, like the headlamps 2 and 3 of Fig. 2. The filaments 5' and 6' of greater intensity and the filaments 7' and 8' of lesser intensity are connected to a battery or other source of electrical energy 9' through a switch 10'. The filament 11' of the signal lamp 4' in this form of the invention is not connected in the circuit of either of the filaments of the headlamps 2' and 3' but is separately energized by a switch 12 which is formed integrally with the switch 10' or so interconnected therewith that the filament 11' of the signal lamp 4' is energized whenever the switch 10' is moved to the position to close the circuit through the filaments 7' and 8' of lesser intensity. In other respects, the invention diagrammatically illustrated by the circuit diagram of Fig. 3 is the same as that described in connection with Figs. 1 and 2.

From the foregoing it will be understood that the present invention provides a very simple and effective way of immediately and positively indicating to the drivers of approaching vehicles and to law enforcement officers in cities that proper and legal lights of an automobile are illuminated and, in the case of driving on highways, will avoid the distraction of drivers of approaching vehicles which necessarily occurs when they think the bright lights of an automobile are burning, when actually the dim lights are the ones which are illuminated.

It is believed that the present invention will in a large measure tend to reduce the "human" element in the voluntary (though legally mandatory) act of operating a car with proper lights. It will increase the safety of night driving by encouraging drivers to dim their lights while approaching another car or while driving in the city. In the case of "one-eyed" cars, it will immediately indicate which light is "blind."

Reference herein to headlamps having filaments of lesser and greater intensities when illuminated is used in a broad sense. Such filaments may be such that when illuminated they emit lights of lesser and greater intensities, or the actual intensities of the light emitted may be the same, but appear of different intensities to the drivers of approaching vehicles because of the direction in which the light rays are projected from the headlamps.

I claim:

1. In a vehicle, an illumination system comprising at least one headlamp positioned to direct a beam of light in front of the vehicle, two sources of light to be projected from the headlamp as beams, a source of electrical energy, an electrical circuit connecting said source of electrical energy with said sources of light, a signal indicator lamp, and means for automatically connecting the signal indicator lamp to the source of electrical energy when one of said sources of light is connected to said source of electrical energy, whereby when electric current is supplied to said one of said sources of light, said signal indicator lamp will be illuminated, the signal indicator lamp being so constructed and positioned on the vehicle as to project a beam of light forwardly of the vehicle when electric current is supplied thereto, whereby the same will be visible to drivers of approaching vehicles.

2. In a vehicle, an illumination system comprising at least one headlamp positioned to direct a beam of light in front of the vehicle, two filaments which, respectively, when heated to incandescence form sources of light to be projected from the headlamp as beams, a source of electrical energy, an electrical circuit connecting said source of electrical energy with said filaments, a signal indicator lamp connected in said circuit with one of said filaments, whereby when electric current is supplied to said one of the filaments said signal indicator lamp will be illuminated, and switch means in said circuit for selectively controlling the supply of electric current from said source to the filaments of the headlamp, said signal indicator lamp being so constructed and positioned on the vehicle as to project a beam of light forwardly of the vehicle when electric current is supplied thereto, whereby the same will be visible to drivers of approaching vehicles.

3. In a vhicle, an illumination system comprising at least one headlamp positioned to direct a beam of light in front of the vehicle, two filaments which, respectively, when heated to incandescence form sources of light to be projected from the headlamp as beams, a source of electrical energy, an electrical circuit connecting said source of electrical energy with said filaments, a signal indicator lamp, means for electrically connecting said signal indicator lamp to said source of electrical energy, switch means for selectively controlling the supply of electric current from said source of electrical energy to the filaments of the headlamp, switch means for controlling the supply of electric current from said source of electrical energy to said signal indicator lamp, said switch means for the signal indicator lamp being so interconnected with the switch means for the filaments of the headlamp, that the signal indicator lamp is connected to said source of electrical energy simultaneously with one of the filaments of the headlamp being connected to said source, the signal indicator lamp being so constructed and positioned on the vehicle as to project a beam of light forwardly of the vehicle when electric current is supplied thereto, whereby the same will be visible to drivers of approaching vehicles.

THOMAS M. JOHNSTON.

REFERENCES CITED

The following references are of record in the file of this patent:

UNITED STATES PATENTS

| Number | Name | Date |
| --- | --- | --- |
| 1,815,294 | Gildner | July 21, 1931 |
| 2,377,706 | McGill | June 5, 1945 |